United States Patent
Kaneko et al.

(10) Patent No.: US 6,332,123 B1
(45) Date of Patent: Dec. 18, 2001

(54) MOUTH SHAPE SYNTHESIZING

(75) Inventors: Masahide Kaneko; Atsushi Koike, both of Tokyo; Yoshinori Hatori, Kawasaki; Seiichi Yamamoto; Norio Higuchi, both of Urawa, all of (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/183,671

(22) Filed: Jan. 19, 1994

Related U.S. Application Data

(63) Continuation-in-part of application No. 07/887,419, filed on May 19, 1992, now abandoned, which is a continuation of application No. 07/488,694, filed on Mar. 5, 1990, now abandoned.

(30) Foreign Application Priority Data

Mar. 8, 1989 (JP) ....................................... 1-53899

(51) Int. Cl.[7] ..................................................... G10L 11/00
(52) U.S. Cl. .......................................... 704/276; 704/258
(58) Field of Search ............................ 395/2, 2.44, 2.69, 395/2.67, 2.79, 2.85, 2.87; 381/44, 48; 345/122; 358/426; 434/185

(56) References Cited

U.S. PATENT DOCUMENTS

| | | | |
|---|---|---|---|
| 3,364,382 | * 1/1968 | Harrison, III | 345/122 |
| 3,662,374 | * 5/1972 | Harrison, III et al. | 395/2 |
| 4,653,100 | * 3/1987 | Barnett et al. | 395/2.69 |
| 4,884,972 | * 12/1989 | Gasper | 434/185 |
| 5,057,940 | * 10/1991 | Murakami et al. | 358/426 |
| 5,111,409 | * 5/1992 | Gasper et al. | 395/2.69 |
| 5,278,943 | * 1/1994 | Gasper et al. | 395/2 |

* cited by examiner

Primary Examiner—David D. Knepper
(74) Attorney, Agent, or Firm—Lackenbach Siegel

(57) ABSTRACT

A picture synthesizing apparatus, and method for synthesizing a moving picture of a person's face having mouth-shape variations from a train of input characters, wherein the method steps comprise developing from the train of input character a train of phonemes, utilizing a speech synthesis technique outputting, for each phoneme, a corresponding vocal sound feature including articulation mode and its duration of each corresponding phoneme of the train of phonemes. Determining for each phoneme a mouth-shape feature corresponding to each phoneme on the basis of the corresponding vocal sound feature, the mouth-shape feature including the degree of opening of the mouth, the degree of roundness of the lips, the height of the lower jaw in a raised and a lowered position, and the degree to which the tongue is seen. Determining values of mouth-shape parameters, for each phoneme, for representing a concrete mouth-shape on the basis of the mouth-shape feature; and controlling the values of the mouth-shape parameters for each phoneme, for each frame of the moving picture in accordance with the duration of each phoneme, thereby synthesizing the moving picture having mouth-shape variations matched with a speech output audible in case of reading the train of input characters.

3 Claims, 4 Drawing Sheets

MOUTH SHAPE SYNTHESIZING

CROSS-REFERENCE TO RELATED APPLICATIONS

This is a continuation-in-part application of application Ser. No. 07/887,419, filed May 19, 1992, and now abandoned, which is a continuation application Ser. No. 07/488,694, filed Mar. 5, 1990, and now abandoned.

BACKGROUND OF THE INVENTION

The present invention relates to a method for synthesizing a picture through digital processing, and more particularly, to a system for synthesizing a (still or moving) picture of a face which represents changes in the shape of mouth accompanying the production of a speech output.

When a main utters a vocal sound, vocal information is produced by an articulator, and at the same time, his mouth moves as he utters (i.e, changes in the shape of the mouth in outward appearance). A method, which converts a sentence input as an input text to speech information and outputs it, is called a speech synthesis, and this method has achieved a fair success. In contrast thereto, few reports have been published on a method for producing a picture of a face which has mouth-shape variations in correspondence to an input sentence, except the following report by Kiyotoshi Matsuoka and Kenji Kurose.

The method proposed by Matsuoka and Kurose is disclosed in a published paper [kiyotoshi Matluoka and Kenji Kurose: "A moving picture program for a training in speech reading for the deaf," Journal of the Institute of Electronic Information and Communication Engineers of Japan, Vol. J70-D, No. 11, pp. 2167–2171 (November 1987)]

Besides, there has also been reported, as a related prior art, a method for presuming mouth-shape variations corresponding to an input text. This method is disclosed in a published paper [Shigeo Morishima, Kiyoharu Aizawa and Hiroshi Hara: "Studies of automatic synthesis of expressions on the basis of speech information," 4TH NICOGRAPH article contest, Collection of Articles, pp. 139–146, Nihon computer Graphics Association (November 1988)]. This article proposes a method which calculates the logarithmic mean power of input speech information and controls the opening of the mouth accordingly and a method which calculates a linear prediction coefficient corresponding to the formant characteristic of the vocal tract and presumes the mouth shape.

The method by Matsuoka and Kurose has been described above as a conventional method for producing pictures of a face which have mouth-shape variations corresponding to a sentence (an input text) being input, but this method poses such problems as follows: Although a vocal sound and the mouth shape are closely related to each other in utterance, the method basically syllabicates the sentence and selects mouth-shape patterns on the basis of the correspondence in terms of characters, and consequently, the correlation between the speech generating mechanism and the mouth-shape generation is insufficient. This introduces difficulty in producing the mouth shape correctly in correspondence to the speech output. Further, although a phoneme (a minimum unit in utterance, a syllable being composed of a plurality of phonemes) differs in duration in accordance with the connection between it and the preceding and following phonemes, the method by Matsuoka and Kurose fixedly assigns four frames to each syllable, and consequently, it is difficult to represent natural mouth-shape variations in correspondence to the input sentence. Moreover, in the case of outputting the sound and the mouth-shape picture in response to the sentence being input, it is difficult to match them with each other.

The method proposed by Morishima, Aizawa and Harashima is to presume the mouth shape on the basis of input speech information, and hence cannot be applied to the production of a moving picture which has mouth-shape variations corresponding to the input sentence.

SUMMARY OF THE INVENTION

In view of the above, an object of the present invention is to provide picture synthesizing method and apparatus which permit the representation of mouth-shape variations, which correspond accurately to speech outputs and agree with the durations of phonemes.

According to an aspect of the present invention, the picture synthesizing method for synthesizing a moving picture of a person's face which has mouth-shape variations in case of reading an input sentence of a train of characters, comprising the steps of:

developing from the input sentence of a train of characters a train of phonemes, by utilizing a speech synthesis technique outputting, for each phoneme, a corresponding vocal sound feature including articulation mode and its duration of each corresponding phoneme of the train of phonemes;

determining for each phoneme a mouth-shaped feature corresponding to each phoneme on the basis of the corresponding vocal sound feature, said mouth-shape feature including the degree of opening of the mouth, the degree of roundness of lips, the height of the lower jaw in a raised or lowered position, and the degree to which the tongue is seen, determining values of mouth-shape parameters, for each phoneme, for representing a concrete mouth-shape on the basis of the mouth-shape feature; and controlling the values of the mouth-shape parameters, for each phoneme, for each frame of the moving picture in is accordance with the duration of each phoneme, thereby synthesizing the moving picture having mouth-shape variations matched with a speech output audible in case of reading the input sentence of a train of characters.

According to another aspect of the present invention, the picture synthesizing apparatus comprising:

an input terminal for receiving an input sentence of a train of characters;

a speech synthesizer for developing from the input sentence a train of characters a train of phonemes, by utilizing a speech synthesis technique and outputting, for each phoneme, a corresponding vocal sound feature including articulation mode and its duration of each corresponding phoneme of the train of phonemes;

a converter for converting the corresponding vocal sound feature for each corresponding phoneme into a mouth-shape feature including the degree of opening the mouth, the degree of roundness of lips, the height of the lower jaw in a raised or lowered position, and the degree to which the tongue is seen;

means for defining a conversion table having established correspondence between various mouth-shape features and mouth-shape parameters for representing concrete mouth-shape;

means for obtaining from the conversion table mouth-shape parameters each corresponding to an individual mouth-shape feature for each phoneme provided by the converter;

a time adjuster having an output whereby values of the mouth-shape parameters from said means for obtaining are controlled in accordance with the duration of each corresponding phoneme from the speech synthesizer for producing a moving picture as a train of pictures spaced apart for a fixed period of time; and a picture generator for generating the moving picture having mouth-shape variations matched with a speech output audible in case of reading the input sentence of a train of characters in accordance with the values of the mouth-shape parameters from said means for obtaining mouth-shape parameters under control of the time adjuster.

BRIEF DESCRIPTION OF THE DRAWINGS

The present invention will be described in detail below in comparison with prior art with reference to accompanying drawing, in which.

DETAILED DESCRIPTION

To make differences between prior art and the present invention clear, an example of prior art will first be described.

Figure 6:
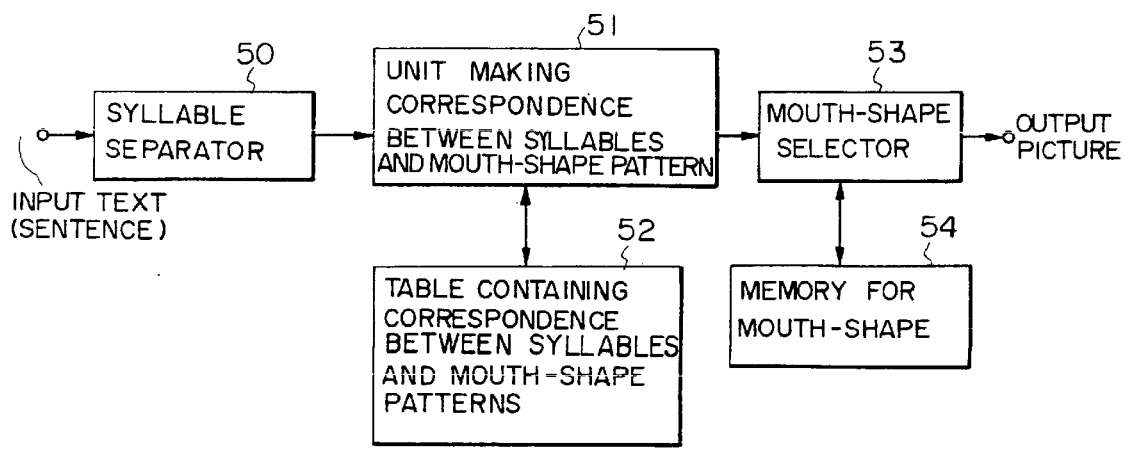
FIG. 6 is a block diagram corresponding to the operation of a conventional picture synthesizing system.

The method of the first-mentioned paper is executed in the form of a program, and the basic concept of obtaining mouth-shape variations corresponding to the input sentence is shown in FIG. 6.

In FIG. 6 reference numeral 50 indicates a syllable separator, 51 a unit making correspondence between syllables and mouth-shape patterns, 52 a table containing correspondence between syllables and mouth-shape patterns, 53 a mouth-shape selector, and 54 a memory for mouth-shape. Next, the operations of these units will be described in brief. The syllable separator 50 divides an input sentence (an input text) in syllables. For instance, an input "kuma" in Japanese is divided into syllables "ku" and "ma". The table 52 is one that prestores the correspondence between prepared syllables and mouth-shape patterns. The syllables each represent a group of sounds "a", "ka", etc. The mouth-shape patterns include big ones (<A><I><U><E><K>, etc.) and small one (<u><o><k><s>, etc.) and indicate the kinds of the mouth shapes. They are used to prestore as a table the correspondence between the syllables and the mouth-shape patterns in such forms as <A><*><A> for "a" and <K><*><A>for "ka", for example. In this case, the symbol <*> indicates an intermediate mouth shape. The unit 51 reads out, for each syllable from the syllable separator 50, the corresponding mouth-shape pattern from the table 52. The memory for mouth-shape 54 is one that prestores, for each of the above-mentioned mouth-shape patterns, a concrete mouth shape as a graphic form or shape parameter. The mouth shape selector 53, when receives mouth-shape patterns from the unit 51, sequentially refers to contents of the memory for mouth-shape 54 to select and outputs concrete mouth shapes as output pictures. At this time, intermediate mouth shapes (intermediate between the preceding following mouth shapes) are also produced. For providing the output as a moving picture, the mouth shape for each syllable is fixedly assigned four frames.

In the following, the present invention will be described.

(Embodiment 1)

Figure 1:
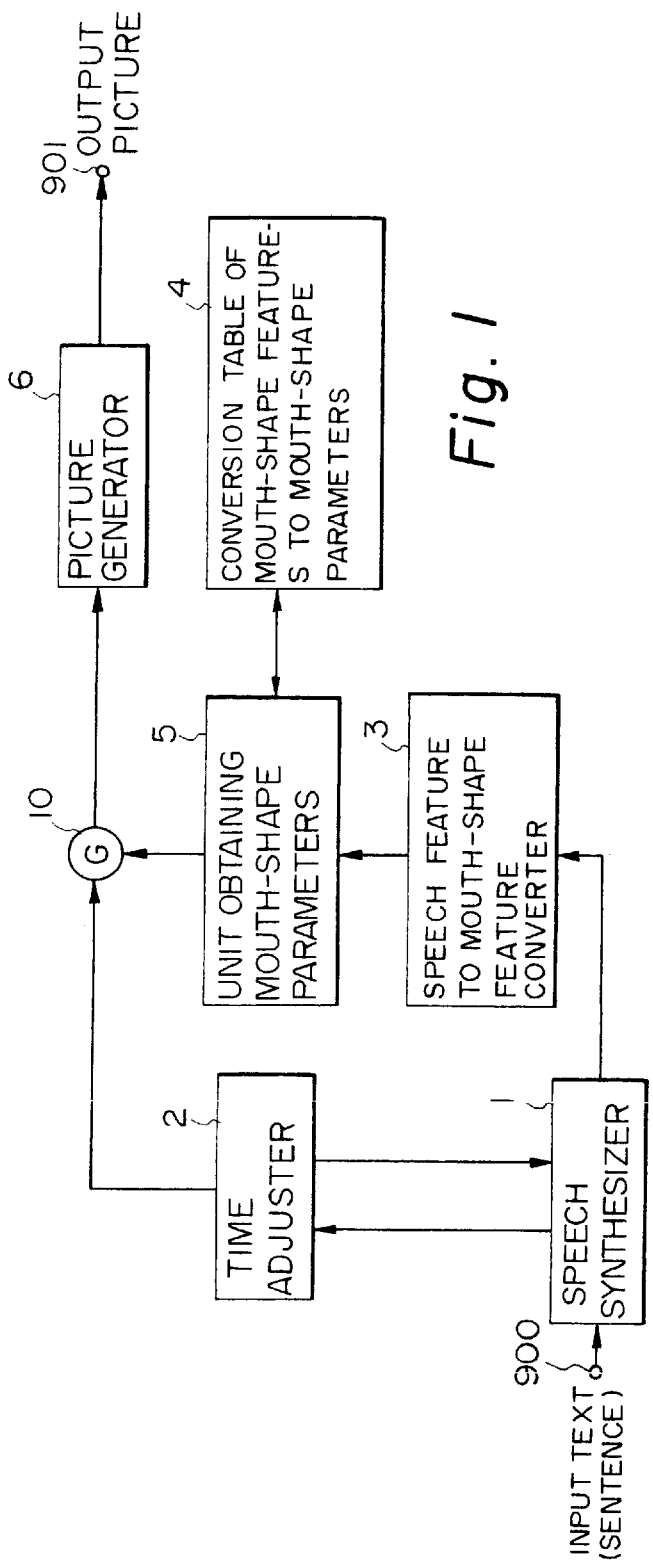
FIG. 1 is a block diagram corresponding to a first embodiment of the present invention.

FIG. 1 is a block diagram explanatory of a first embodiment of the present invention. Now, assume that input information is an input text (a sentence) obtainable from a keyboard or file unit such as a magnetic disk. In FIG. 1 reference numeral 1 indicates a speech synthesizer, 2 a time adjuster, 3 a speech feature to mouth-shape feature converter, 4 a conversion table of mouth-shape features to mouth-shape parameters, 5 a unit obtaining mouth-shape parameters, 6 a picture generator, 10 a gate, 900 an input text (sentence) terminal, and 901 an output picture terminal.

Next, the operation of each unit will be described. The speech synthesizer 1 synthesizes a speech output corresponding to an input sentence. Various systems have been proposed for speech synthesis, but it is postulated here to utilize an existing speech rule synthesizing method which employs a Klatt type format speech synthesizer as a vocal tract model, because it is excellent in matching with the mouth-shape generation. This method is described in detail in a published paper [Seiichi Yamamoto, Norio Higuchi and Tohru Shimizu: "Trial Manufacture of a Speech Rule Synthesizer with Text-Editing Function," Institute of Electronic Information and Communication Engineers of Japan, Technical Report SP87–137 (March 1988)]. No detailed description will be given of the speech synthesizer, because it is a known technique and is not the applied object of the present invention. The speech synthesizer needs only to output information of a vocal sound feature and a duration for each phoneme so as to establish accurate correspondence between generated voice and mouth shapes. According to the method by Yamamoto, Higuchi and Shimizu, the speech synthesizer is adapted to output vocal sound features such as an articulation mode, an articulation point, a distinction between voiced and voiceless sound and pitch control information and information of a duration based thereon, and fulfils the requirement. Other speech synthesizing methods can be employed, as long as they provide such information.

Moreover, if the information of a vocal sound feature and a duration for each phoneme is obtained, the present invention can be applied to an input text of English, French, German, etc. as well as Japanese.

The time adjuster 2 is provided to control the input of a mouth-shape parameter into the picture generator 6 on the basis of the duration of each phoneme (the duration of an i-th phoneme being represented by $t_i$) which is provided from the speech synthesizer 1. That is, when a picture (a moving picture, in particular) is output as a television signal of 30 frames per second by the NTSC television system, for example, it is necessary that the picture be generated as information for each 1/30 second. The operation of the time adjuster 2 will be described in detail later on.

Figure 2B:
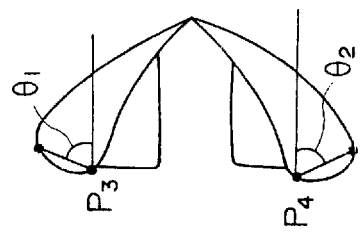
FIGS. 2A and 2B are diagrams showing examples of parameter for representing a mouth shape.

The converter 3 converts the vocal sound feature from the speech synthesizer 1 to a mouth-shape feature corresponding to the phoneme concerned. The mouth-shape features are, for example, (1) the degree of opening of the mouth (appreciably open–completely shut), (2) the degree of roundness of lips (round–drawn to both sides), (3) the seen is defined by the positions of points $Q_1$ and $Q_2$, and the thicknesses of upper and lower lips are defined by values $h_1$, and $h_2$. FIG. 2B is a side view of the mouth portion, and inversions of the upper and lower lips are defined by angles $\theta_1$ and $\theta_2$. These parameters are adopted for representing natural mouth-shapes. However, more kinds of parameters can be utilized. Mouth-shapes may also be represented by parameters and indications other than those of FIGS. 2A and 2B. In the conversion table 4 there are prestored, in the form of a table, sets of values of the above-mentioned parameters $P_1$ to $P_8$, $Q_1$, $Q_2$, $h_1$, $h_2$, $\theta_1$ and $\theta_2$ predetermined on the basis of the results of measurements of the mouth shapes of a man when he actually utters vocal sounds.

In response to the mouth-shape feature corresponding to the phoneme concerned, provided from the speech feature to mouth-shape feature converter 3, the unit 5 refers to the conversion table 4 to read out therefrom a set of values of mouth-shape parameters for the phoneme.

The gate 10 is provided for controlling whether or not the above-mentioned mouth-shape parameters for the phoneme are sent to the picture generator 6, and this sends the mouth-shape parameters to the picture generator 6 by the number of times specified by the time adjuster 2 (a value obtained by multiplying the above-mentioned number of times by 1/30 second being the time for displaying the mouth shape for the phoneme).

The picture generator 6 generates a picture of the mouth based on the mouth-shape parameters sent for each height of the lower jaw (raised~lowered), and (4) the degree to which the tongue is seen. Based on an observation of how a man actually utters each phoneme, the correspondence between the vocal sound feature and the mouth-shape feature is formulated.

For example, in the case of a Japanese sentence "kon-nichiwa" being input, vocal sound features are converted to mouth-shape features as follows:

| ## (voiceless sound) | 1v0 | 1h4 | jaw4 | |
|---|---|---|---|---|
| k | 1v2 | 1hx | jaw2 | tbck |
| o | 1v2 | 1h1 | jaw2 | |
| i | | | | |

In the above $1v$, $1h$ and jaw represent the degree of opening of the mouth, the degree of roundness of lips, and the height of the lower jaw, respectively, the numerals represent their values, x indicates that their degree is determined by preceding and succeeding phonemes, and tbck represents the degree to which the tongue is seen. (In this case, it is indicated that the tongue is slightly seen at the back of the mount.)

The conversion table 4 for converting the mouth-shape feature to the corresponding mouth-shape parameter is a table which provides the parameter values for representing a concrete mouth shape for each of the afore-mentioned mouth-shape features. Examples of parameters for representing mouth shapes are shown in FIGS. 2A and 2B.

Figure 2A:
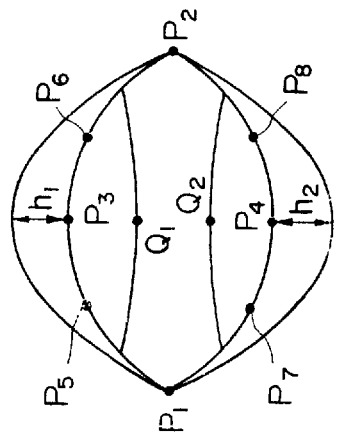

FIG. 2A is a front view of the mouth portion. The mouth shape is defined by the positions of eight points $P_1$ through $P_8$, the degree to which upper and lower teeth are 1/30 second from the unit 5 via the gate 10,. A picture including the whole face in addition to the mouth portion is generated as required. The details of the generation of a picture of a mouth or face based on mouth-shape parameters are described in, for example, a published paper [Masahide Kaneko, Yoshinori Hatori and Kiyoshi Koike, "Detection of Shape Variations and Coding of a Moving Face Picture Based on a Three-Dimensional Model," Journal of the Institute of Electronic Information and Communication Engineers of Japan, B, Vol. J71-B, No. 12, pp. 1554–1563 (December 1988)]. In rough terms, a three-dimensional wire frame model is at first prepared which represents the three-dimensional configuration of the head of a person, and mouth portions (lips, teeth, jaws, etc., in concrete terms) of the three-dimensional wire frame model are modified in accordance with mouth-shape parameters provided. By providing to the modified model information specifying the shading and color of each part of the model for each picture element, it is possible to obtain a real picture of the mouth or face.

Figure 3:
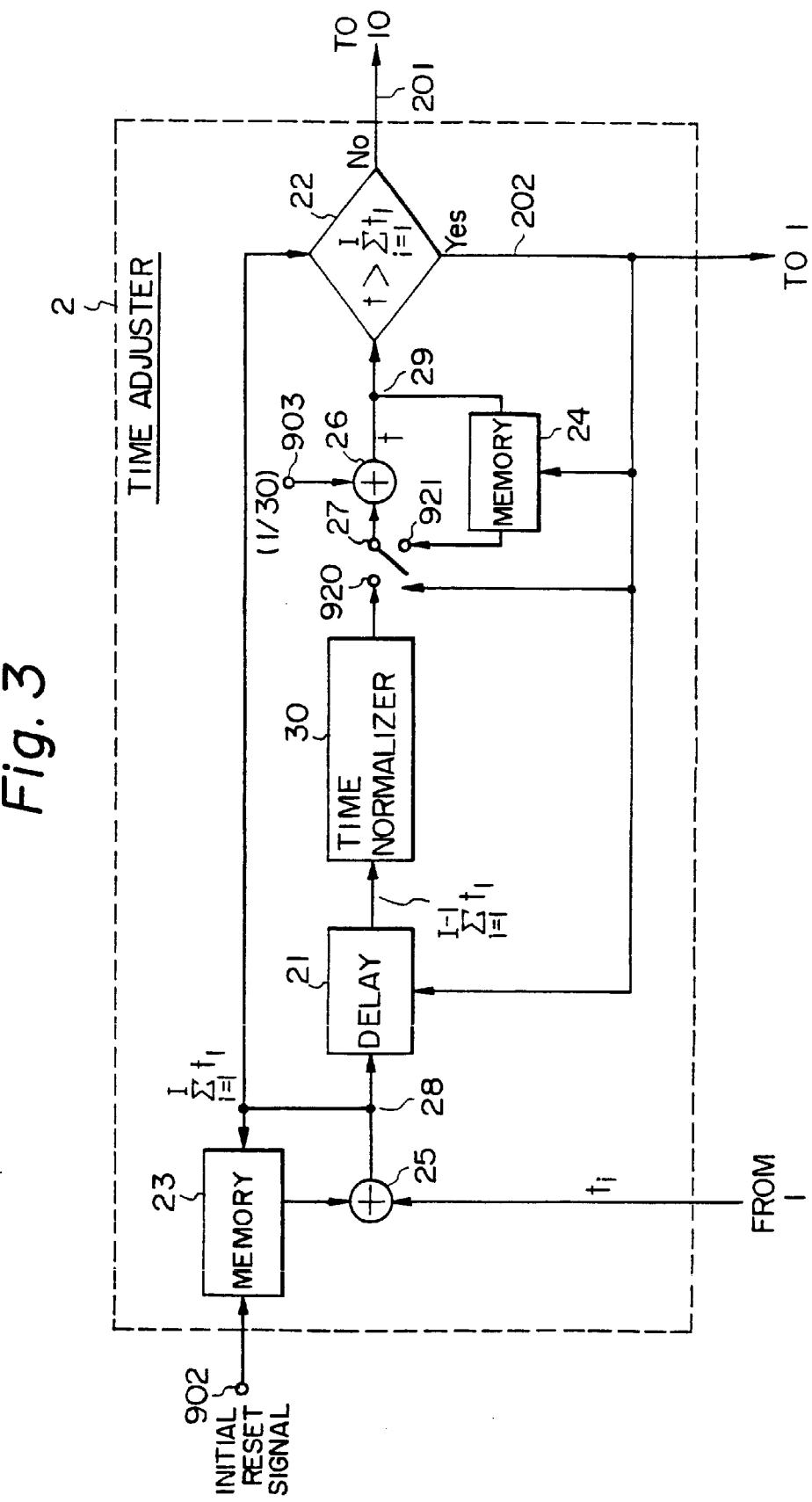
FIG. 3 is a block diagram corresponding to an example of the operation of a time adjuster employed in the present invention.

Now, the operation of the time adjuster 2 will be described in detail. FIG. 3 is a block diagram explanatory of the structure and operation of the time adjuster 2. In FIG. 3 reference numeral 21 indicates a delay, 22 a comparator, 23 and 24 memories, 25 and 26 adders, 27 a switch, 28 and 29 branches, 30 a time normalizer, 201 and 202 output lines of the comparator 22, 902 an initial reset signal terminal, 903 a constant (1/30) input terminal, and 920 and 921 terminals of the switch 27. Next, the operation of each of these parts will be described. The memory 23 is provided for storing a total duration, $$\sum_{i=1}^{I} t_i,$$

to an I-th phoneme. Prior to the start of picture synthesis, a zero is set in the memory 23 by an initial reset signal from the terminal 902. When the duration of the I-th phoneme is provided from the speech synthesizer 1, the total duration $$\sum_{i=1}^{I-1} t_i$$

to an (I–1)th phoneme stored in the memory 23 and the duration $t_I$ of the I-th phoneme are added by the adder 25 to obtain the sum $$\sum_{i=1}^{I} t_i,$$

and the delay 21 serves to store the total duration $$\sum_{i=1}^{I-1} t_i$$

to the (I–1)th phoneme until processing for the (I+1)th phoneme is initiated. In response to the output $$\sum_{i=1}^{I-1} t_i$$

of the delay 21, the time normalizer 30 obtains an N which satisfies $$(1/30) \times N \le \sum_{i=1}^{I-1} t_i < (1/30) \times (N+1),$$

and outputs a value $(1/30) \times N$, where N is an integer and 1/30 is a constant which provides a one-frame period of 1/30 second. The switch 27 is connected to the terminal 920 by the output 202 from the comparator 22 when processing for the I-th phoneme is started. At this time, the sum t of the output 1/30×N of the time normalizer 30 and the constant 1/30 is calculated by the adder 26. The comparator 22 compares the value t and the value $$\sum_{i=1}^{I} t_i$$

with each other, and provides a signal on the output line 201 or 202 depending on whether $$t \le \sum_{i=1}^{I} t_i$$

or $$t > \sum_{i=1}^{I} t_i.$$

The latter case means the expiration of the duration of the I-th phoneme, issuing through the output line 202 an instruction to the speech synthesizer 1 to output information of the (I+1)th phoneme, an instruction to the memory 24 to reset its contents, an instruction to the switch 27 to connect the same to the terminal 920, and an instruction to the delay 21 to output the value of the delayed duration $$\sum_{i=1}^{I} t_i.$$

The memory 24 is provided to temporarily store the output of the adder 26. The switch 27 is connected to the terminal 921 while $$t \le \sum_{i=1}^{I} t_i$$

holds, during which the adder 26 renews the preceding sum t by adding thereto the constant 1/30 for each frame. In this way, while $$t \le \sum_{i=1}^{I} t_i$$

holds, the comparator 22 provides the signal on the output line 201 to enable the gate 10 in FIG. 1, through which mouth-shape parameters corresponding to the I-th-phoneme are supplied to the picture generator 6 duration of the I-th phoneme.

The above is the first embodiment of the present invention. In the first embodiment, when the I-th phoneme changes to the (I+1)th phoneme, the mouth-shape parameters of the former discontinuously change to the mouth-shape parameters of the latter. In this instance, if the mouth-shape parameters of the both phonemes do not differ widely from each other, the synthesized moving picture will not be so unnatural. When a person utters vocal sounds, however, his mouth shape changes continuously; therefore, when the I-th phoneme changes to the (I+1)th phoneme, it is desirable that the mouth shape of the moving picture changes continuously.

(Embodiment 2)

Figure 4:
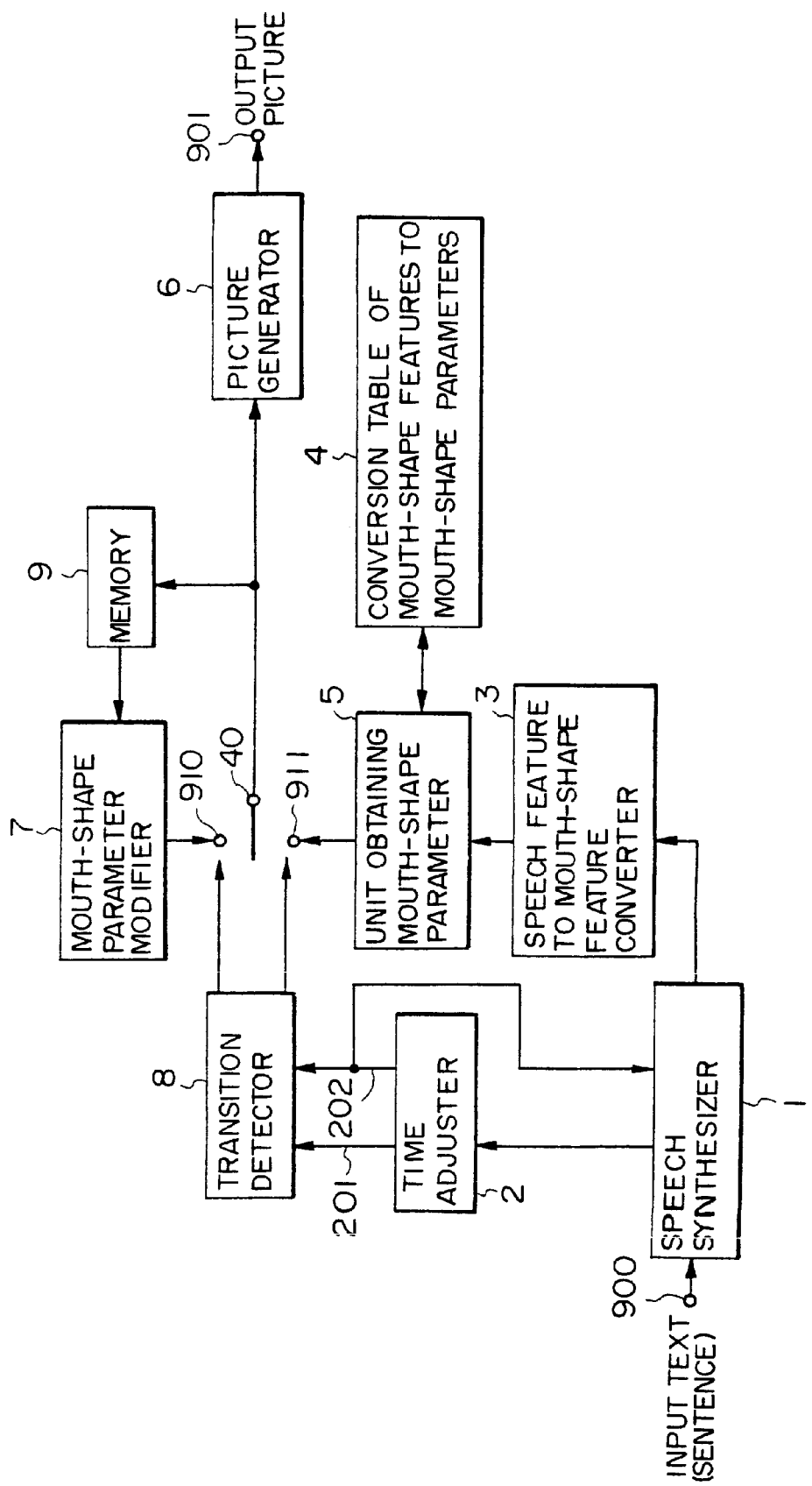
FIG. 4 is a block diagram corresponding to a second embodiment of the present invention.

FIG. 4 is a block diagram explanatory of a second embodiment of the present invention designed to meet with the above requirement. In FIG. 4 reference numeral 7 indicates a mouth-shape parameter modifier, 8 a transition detector, 9 a memory, 40 a switch, and 910 and 911 terminals of the switch 40. This embodiment is identical in construction with the FIG. 1 embodiment except the above. Now, a description will be given of the operations of the newly added units.

Figure 5:
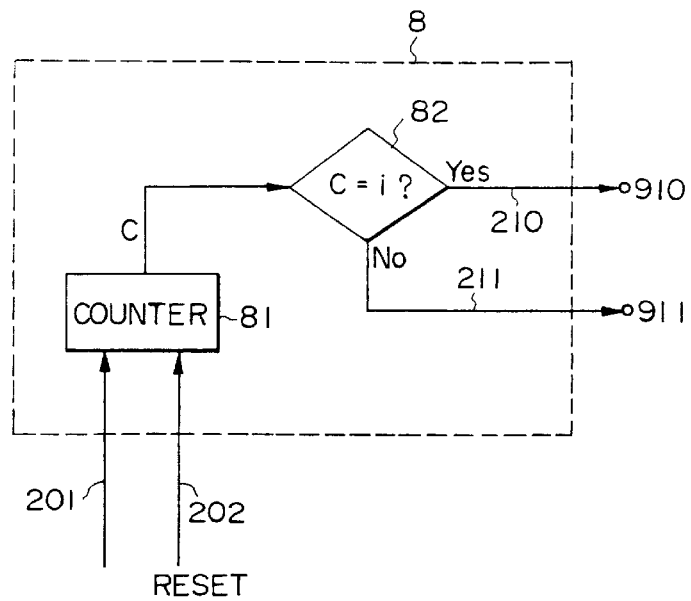
FIG. 5 is a block diagram corresponding to an example of the operation of a transition detector employed in the second embodiment of the present invention.

The transition detector 8 is to detect the transition from a certain phoneme (the I-th phoneme, for example) to the next one (the (I+1)th phoneme). FIG. 5 is a block diagram explanatory of the operation of the transition detector 8 according to the present invention. Reference numeral 81 indicates a counter, 82 a decision circuit, and 210 and 211 output lines. The counter 81 is reset to zero when the comparator 22 provides a signal on the output line 202, and the counter 81 is incremented by one whenever the comparator 22 provides a signal on the output line 201. The decision circuit 82 determines whether the output of the counter 81 is a state "1" or not and, when it is the state "1", provides a signal on the output line 210, because the state "1" indicates the occurrence of transition from a certain phoneme to the next. When the counter output is a state "2" or more, this means that the current phoneme still lasts, and the decision circuit 82 provides a signal on the output line 211.

The memory 9 is provided for storing, for at least one frame period, the mouth-shape parameters used for synthesizing a picture of the preceding frame. The mouth-shape parameter modifier 7 obtains, for instance, intermediate values between the mouth-shape parameters of the preceding frame stored in the memory 9 and the mouth-shape parameters for the current phoneme which are provided from the unit 5 to provide such intermediate values as mouth-shape parameters for synthesizing a picture of the current frame. The switch 40 is connected to the terminal 910 or 911, depending on whether the transition detector 8 provides a signal on the output line 210 or 211. Consequently, the intermediate values between the mouth-shape parameters for two phonemes, available from the mouth-shape parameter modifier 7, or the mouth-shape parameters for the current phoneme are supplied to the picture generator 6, depending on whether the switch 40 is connected to the terminal 910 or 911. While in the above the intermediate values between the mouth-shape parameters of a certain phoneme and the next are produced for only one frame, it is also possible to implement more smooth mouth-shape variations by producing such intermediate values at more steps in accordance with the counting state of the counter 82, for instance.

As described above, the present invention is directed to a system for synthesizing a moving picture of a person's face which has mouth-shape variations corresponding to a sentence input. However, if it is possible to utilize a speech recognition method by which, even if speech information is input, it can be divided into a train of phonemes and a voice feature for each phoneme and its duration can be output, then a moving picture with mouth-shape variations corresponding to the input speech information can also be synthesized by replacing the speech synthesizer 1 in the present invention by a speech detector which performs such operations as mentioned above.

As described above, the present invention permits the synthesis of a moving picture which has an accurate correspondence between a sentence input and a speech output and mouth-shape variations corresponding to the duration of each phoneme and consequently natural mouth-shape variations well matched with the speech output.

The prior art can only synthesize a speech output but the present invention allows ease in producing not only such a speech output but also a moving picture having natural mouth-shape variations well matched with the speech output. Accordingly, the present invention is applicable to the production of a moving picture without the necessity of actual film shooting (the production of a television program or movie, for example), an automatic response unit and a man-machine interface utilizing a speech and a picture, and the conversion of medium from a sentence to a speech and a moving picture. Hence, the present invention is of great utility in practical use.

What we claim is:

1. A picture synthesizing method for synthesizing a moving picture of a person's face having mouth-shape variations from a train of input characters, comprising the steps of:

developing from the train of input characters a train of phonemes, utilizing a speech synthesis technique outputting, for each phoneme, a corresponding vocal sound feature including articulation mode and its duration of each corresponding phoneme of the train of phonemes;

determining for each phoneme a mouth-shape feature corresponding to each phoneme on the basis of the corresponding vocal sound feature, said mouth-shape feature including the degree of opening of the mouth, the degree of roundness of the lips, the height of the lower jaw in a raised and a lowered position, and the degree to which the tongue is seen, determining values of mouth-shape parameters, for each phoneme, for representing a concrete mouth-shape on the basis of the mouth-shape feature; and controlling the values of the mouth-shape parameters, for each phoneme, for each frame of the moving picture in accordance with the duration of each phoneme, thereby synthesizing the moving picture having mouth-shape variations matched with a speech output audible in case of reading the train of input characters.

2. A picture synthesizing apparatus comprising:

an input terminal for receiving a train of input characters;

a speech synthesizer for developing from the train of input characters a train of phonemes, utilizing a speech synthesis technique and outputting, for each phoneme, a corresponding vocal sound feature including articulation mode and its duration of each corresponding phoneme of the train of phonemes;

a converter for converting the corresponding vocal sound feature for each corresponding phoneme into a mouth-shape feature including the degree of opening the mouth, the degree of roundness of the lips, the height of the lower jaw in a raised and lowered position, and the degree to which the tongue is seen;

means for defining a conversion table having established correspondence between various mouth-features and mouth-shape parameters for representing concrete mouth-shape;

means for obtaining from the conversion table mouth-shape parameters each corresponding to an individual mouth-shape feature for each phoneme provided by the converter;

a time adjuster having an output whereby values of the mouth-shape parameters from said means for obtaining are controlled in accordance with the duration of each corresponding phoneme from the speech synthesizer for producing a moving picture as a train of pictures spaced apart for a fixed period of time; and a picture generator for generating the moving picture having mouth-shape variations matched with a speech output audible in case of reading the train of input characters in accordance with the values of the mouth-shape parameters from said means for obtaining mouth-shape parameters under control of the time adjuster.

3. A picture synthesizing apparatus according to claim 2, further comprising: a transition detector for detecting a transition from a certain phoneme to the next in accordance with the output of the time adjuster, a memory capable of storing for at least one frame period the values of the mouth-shape parameters used in the picture generator, and a mouth-shape parameter modifier for obtaining an intermediate value between the value of the mouth-shape parameter stored in the memory and the value of the mouth-shape parameter provided from said means for obtaining the mouth-shape parameters, whereby during the transition from the certain phoneme to the next an intermediate mouth shape corresponding to said intermediate value is generated, producing the moving picture of a person's face with smooth mouth-shape variations.

* * * * *